US009637193B1

(12) United States Patent
Porter et al.

(10) Patent No.: US 9,637,193 B1
(45) Date of Patent: May 2, 2017

(54) BICYCLE SADDLE THAT BALANCES SITTING FORCE (71) Applicant: David R. Porter, Kansas City, MO (US)

(72) Inventors: David R. Porter, Kansas City, MO (US); Drake L. Koch, Kansas City, MO (US)

(73) Assignee: David R. Porter, Kansas City, MO (US)

( * ) Notice: Subject to any disclaimer, the term of this patent is extended or adjusted under 35 U.S.C. 154(b) by 0 days.

(21) Appl. No.: 14/936,652

(22) Filed: Nov. 9, 2015

(51) Int. Cl.
*B62J 1/26* (2006.01)
*B62J 1/00* (2006.01)
*B62J 1/06* (2006.01)

(52) U.S. Cl.
CPC ................ *B62J 1/26* (2013.01); *B62J 1/002* (2013.01); *B62J 1/06* (2013.01)

(58) Field of Classification Search
CPC ..... B62J 1/26; B62J 1/002; B62J 1/005; B62J 1/06
USPC ................................ 297/199, 200, 201, 202
See application file for complete search history.

(56) References Cited

U.S. PATENT DOCUMENTS

| 2,558,389 | A | * | 6/1951 | Robinson | B62J 1/26 297/200 |
| 3,982,786 | A | * | 9/1976 | Burgin | A47C 4/54 297/284.3 |
| 4,504,089 | A | | 3/1985 | Calvert et al. | |
| 4,611,851 | A | | 9/1986 | Noyes et al. | |
| 5,636,896 | A | * | 6/1997 | Howard | B62J 1/26 297/199 |
| 5,738,406 | A | | 4/1998 | Deus | |
| 5,938,277 | A | | 8/1999 | Rioux et al. | |
| 7,448,676 | B2 | | 11/2008 | Wyner et al. | |

FOREIGN PATENT DOCUMENTS

NL            1004077 C1 *  3/1998  ............... B62J 1/26

* cited by examiner

*Primary Examiner* — Milton Nelson, Jr.
(74) *Attorney, Agent, or Firm* — Erickson Kernell IP, LLC (57) ABSTRACT A bicycle saddle includes a seat bladder fastened to a base frame. The seat bladder has one or more cavities that include an internal channel along a portion of the seat bladder's centerline that blocks the flow of fluid from side-to-side along the length of the internal channel. A rear fluid channel allows fluid to flow from side-to-side as the rider's weight shifts from side-to-side during the pedaling cycle. Fluid also flows from side-to-side where the pommel portion flows into the wider seating portion of the set bladder by moving around the forward end of the longitudinal channel. The perimeter of the seat bladder overhangs the perimeter of the base frame by a variable amount throughout the perimeter of the base frame.

2 Claims, 13 Drawing Sheets

BICYCLE SADDLE THAT BALANCES SITTING FORCE

FIELD

The present invention is related to a bicycle saddle. More particularly, the present invention is related to a bicycle saddle having a hollow seat bladder that can be filled with a fluid to distribute the rider's weight as the rider shifts from side to side.

BACKGROUND

Ever since bicycles were invented, inventors have tried to devise a comfortable bicycle saddle. When tires were wide and bicycle riding a relaxing pastime, very wide saddles with a lot of padding and even coil spring suspensions were designed and used. These types of saddles were reasonably comfortable, but were quite heavy.

As bicycles lost weight and slimmed down, even more-or-less casual riders wanted lighter and faster bicycles and many riders adopted the so-called racing saddle, which tends to have a long narrow pommel, meant to reduce the saddle's interference with the rider's thighs as they go up and down to operate the pedals. The rear portion of the racing saddle is also fairly narrow. The cover and seating surface are typically hard—not designed for comfort—but for light weight and speed.

Many of those who ride bicycles are serious riders, but not professional racers. They do not find either the plush padded and sprung saddle or the conventional hard riding saddle to be satisfactory. The heavily padded sprung saddle adds too much weight to the bicycle and interferes too much with the pumping action of the rider's thighs and would look unaesthetic on a modern bicycle built for speed. The hard racing saddle, on the other hand, is simply uncomfortable and the serious but not fanatic rider finds is terribly uncomfortable, particularly on long rides.

Efforts to have been made to find some comfortable middle ground. One approach has been to provide bicycle saddles with modest sized cushions filled with a somewhat compressible gel compound. This is similar to the heavily padded bicycle saddle but with a more dynamic shape and perhaps better cushioning, but the saddle itself is not dynamic and the only cushioning effect is derived through compressing the gel compound, which is typically locked into fixed chambers, or the soft nature of the gel compound itself. These types of saddles tend to lose any comfort benefit relative to the old large padded saddles due to their smaller size.

Other developers have tried to make a light-weight comfortable bicycle saddle by fixing an inflatable bladder of some sort onto a base and then introducing a desirable air pressure into the bladder.

These designs unnecessarily limit the potential for increasing rider comfort by attaching the perimeter of the bottom of a bladder to the co-extensive perimeter of a frame, by confining the fluid to a single closed cell or to one or more closed cells in single saddle. The internal pressure of any single cell bladder increases whenever an external force, such as a bicycle rider's weight, is applied to it, regardless of the fluid inside the bladder. The increased pressure inside the bladder will be magnified against the rider's body when the rider's weight is largely concentrated over a small area, namely the ischial tuberosity.

Therefore there is a need for a bicycle saddle that actively alleviates pressure on the rider's pressure points as the rider's weight shifts from one side to the other during the pedaling cycle. There is also a need for such a bicycle saddle that is lightweight relative to other related types of bicycle saddles.

SUMMARY

Accordingly, the present invention provides a bicycle saddle that balances sitting force and that actively alleviates pressure on the rider's pressure points, that is, the ischial tuberosity, as the rider's weight shifts from one side to the other during the pedaling cycle, increasing rider comfort. The bicycle saddle is lightweight relative to other related types of bicycle saddles.

The bicycle saddle of the present invention may include a lightweight flat metal frame with a pair of mounting rails attached to its lower surface and a seat bladder fixed to the frame. The seat bladder may include an interior cavity that is divided into a left seating portion and a right seating portion connected by a channel.

Fluid flows from side-to-side between the left and right interior cavity as the rider's weight shifts during the pedaling cycle. Fluid can also flow from side-to-side where the pommel portion flows into the wider seating portion of the seat bladder by moving around the forward end of the longitudinal channel. These two flow channels or areas allow the seat bladder to dynamically balance sitting pressure experienced by the rider. As excessive sit bone force is applied to one side of the bicycle saddle, fluid in that side of the seat bladder readily flows to opposite side to balance the sitting force on both hips.

The perimeter of the seat bladder may overhang the perimeter of the frame by a variable amount along the perimeter to allow the edges of the seat bladder to further enhance rider comfort.

The bicycle saddle may be filled with air at whatever pressure the rider desires or with water or other liquid or with a slurry of water with entrained micro-beads of expanded polystyrene or the like.

Other advantages of the present invention will become apparent from the following description taken in connection with the accompanying drawings, wherein is set forth by way of illustration and example, the preferred embodiment of the present invention and the best mode currently known to the inventors for carrying out their invention.

DETAILED DESCRIPTION

Figure 1:
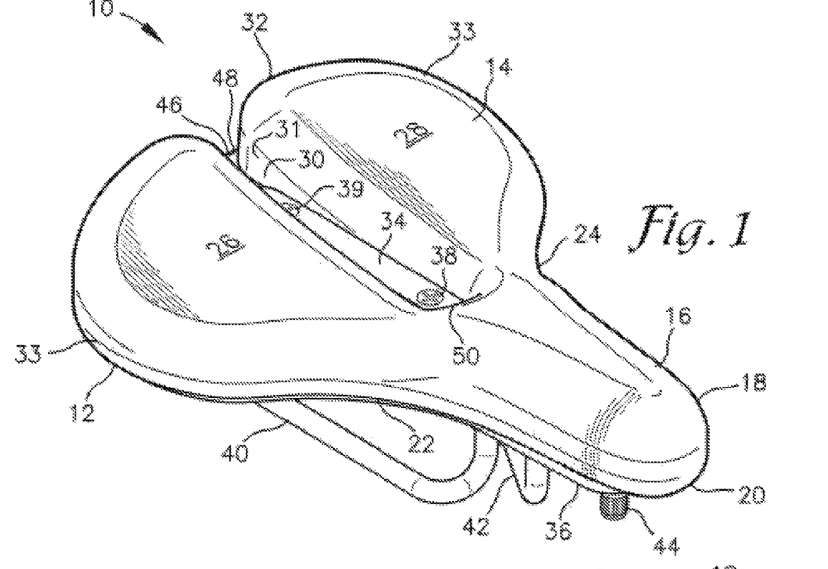
FIG. 1 is a front right perspective view of a bicycle saddle according to the present invention.
Figure 2:
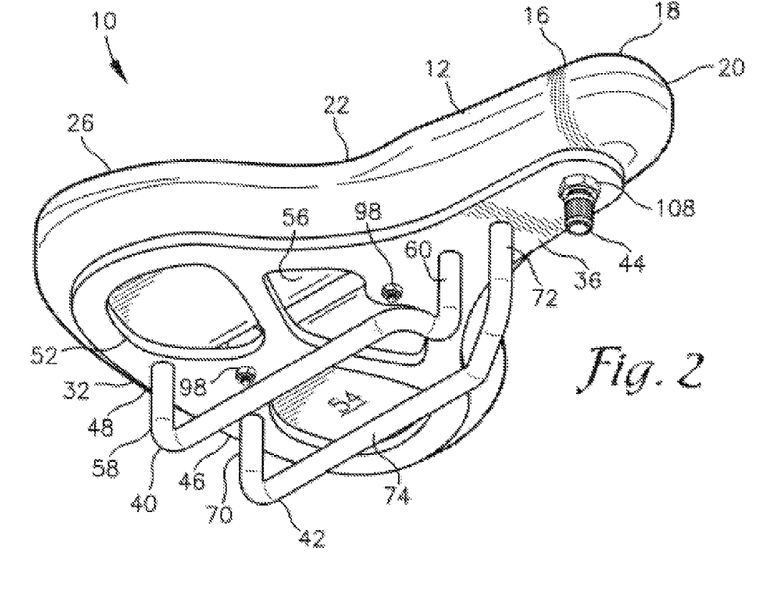
FIG. 2 is a front right upward looking view of the bicycle saddle of FIG. 1.

Referring initially to FIGS. 1 and 2, a bicycle saddle that balances sitting force according to the present invention is generally indicated by reference numeral 10. Bicycle saddle 10 includes a seat bladder 12 having a seating surface portion 14 as its top surface. The seat bladder 12, which has a perimeter 33, is hollow, flexible and sealed to retain any fluid inside of it and is preferably made by rotational molding of a durable flexible rubber or plastic material. The interior space of the bladder 12 is a single cell having controls on the flow of fluid throughout it, as discussed in detail below. The seating surface 14 includes an elongated pommel portion 16 for stabilizing a rider during pedaling. The pommel gradually and symmetrically widens from the pommel nose 18 at the front end 20 of the bicycle saddle 10 to the right side flare point 22 and the left side flare point 24 where the seat bladder 12 flares outwardly to form a right side cushion 26 for supporting the rider's right hip and a left side cushion 28 for supporting the rider's left hip.

The right and left sides of the bicycle saddle 10 are defined from the point of view of a rider sitting on the bicycle saddle 10 with the pommel portion 16 being toward the front of the bicycle saddle 10. The right side cushion 26 and the left side cushion 28 are separated by a longitudinal channel 30, which is formed as an upper recess 31 that forms the transition from the seating surface 14 to the bottom of the longitudinal channel 30, that runs along the longitudinal centerline of the bicycle saddle 10 from the rear edge 32 of the bicycle saddle 10 to a point along the length of the bicycle saddle 10 where the flare points 22 and 24 are located.

The seat bladder 12 may be fastened to an underlying base frame 36 along three points along the common, that is, superposed, centerlines of the seat bladder 12 and the base frame 36. An elongated top fastening strap 34 contacts the length of the channel 30 and is secured to the base frame 36 by a front screw 38 and a rear screw 39, or other fasteners. A right rail 40 and a left rail 42 may be fastened to the bottom surface of the base frame 36 and protrude downwardly from the base frame 36. The rails 40 and 42 are aligned along a long axis of the bicycle saddle 10 and are parallel to one another for a portion of their lengths. Rails 40 and 42 lie equidistant from the base frame 36 for the parallel portion of their lengths. Rails 40 and 42 are used for mounting the bicycle saddle 10 on the seat tube of a bicycle using any conventional clamping assembly (not shown).

A valve assembly 44, for admitting or releasing a fluid into the seat bladder 12, may be mounted and fixed on the underside of the base frame 36 adjacent to the pommel nose 18, as shown in FIG. 2, and may be mounted and fixed on the underside of the base frame 36 at any desired location. Valve assembly 44 penetrates the lower surface of the seat bladder 12 and is sealed inside the seat bladder 12. The seat bladder 12 may be filled with any fluid, such as air, a gas, a gel, water or water with entrained solid particles, for example, to any user desired pressure, through the valve assembly 44.

A rear fluid channel 46 along the rear edge 48 of the seat bladder 12 allows fluid to flow back and forth between the right side cushion 26 and the left side cushion 28 as the rider's sit bone force shifts from side to side during pedaling. The rear fluid channel 46 connects the right side cushion 26 and the left side cushion 28 adjacent to the lower surface of the seat bladder 12. As illustrated, but not limiting, the rear fluid channel 46 is below and behind the right side and the left side cushions 26 and 28, with the rear fluid channel 46 being in fluid communication with the right side cushion 26 and the left side cushion 28 of the seat bladder 12. The rear fluid channel 46 has opposed ends, which open into the cavities of the right and left side cushions 26 and 28, respectively. As a result of these fluid flows, as the rider places more weight on one side of the bicycle saddle 10, that side deflates and the other side inflates, dynamically balancing the pressure on both sides of the bicycle saddle 10, thereby ensuring even and balanced cushioning for both sit bones throughout the pedaling cycle.

Figure 3:
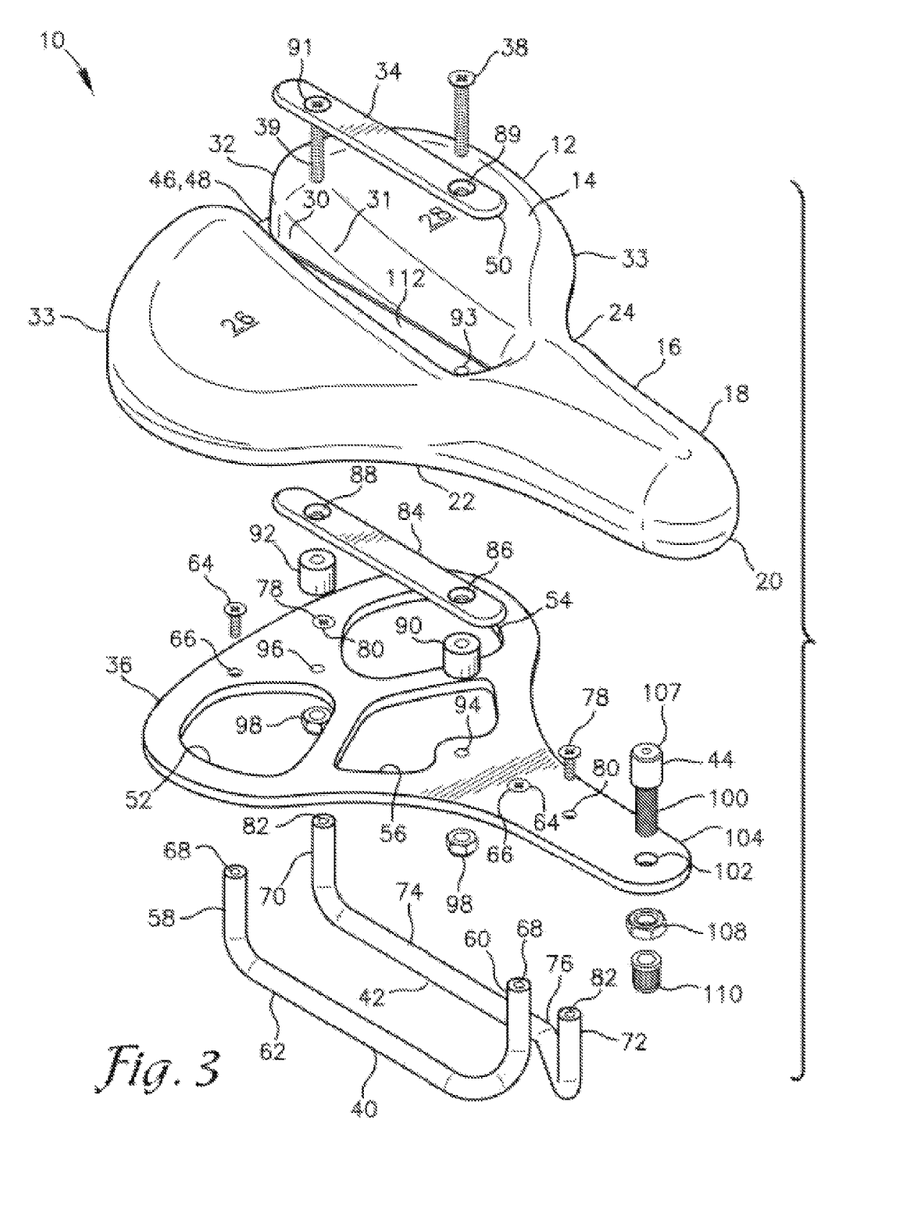
FIG. 3 is an exploded perspective view of the bicycle saddle of FIG. 1 showing the same view as FIG. 1.

Referring to FIG. 3, the base frame 36 is a flat relatively thin member preferably made from aluminum, steel, plastic, composite material, or the like having a shape that largely follows the contour of the bottom surface of the seat bladder 12. The perimeter of the base frame 36 may be smaller than the perimeter of the bottom of the seat bladder 12, that is, the outline of the base frame 36 may be smaller than the outline of the bottom of the seat bladder 12, causing the seat bladder 12 to overhang the base frame 36 alone the perimeter of either by an amount of about 0.95-1.9 cm (0.375-0.75 inches), thereby increasing the downward flexibility of the seat bladder 12 along its outer edges and improving rider comfort.

The base frame 36 includes a large right cut out portion 52, a large left cut out portion 54 and a large forward cut out portion 56. The shapes of these cut out portions is substantially determined by the placement of various fasteners that penetrate the base frame 36. Their sizes may be determined by balancing their weight reduction purpose with the desired rigidity of the base frame 36 and preventing any excess downward bulge of the seat bladder 12 through the cut out portions 52, 54 and 56.

The right rail 40 has an upstanding rear leg 58 and an upstanding front leg 60, both connected by a straight central portion 62. The top of each leg 58, 60 is drilled and tapped and fastened to the base frame 36 by the screws 64, which pass through the corresponding apertures 66 in the base frame 36 and into the drilled and tapped bores 68 in the legs 58, 60. The left rail 42 includes an upstanding rear leg 70 and an upstanding front leg 72, both connected by a long intermediate central portion 74, having a bend 76 in a horizontal plane that moves the front leg 72 toward the right of the bicycle saddle 10. The left rail 42 is fastened to the base frame 36 by the screws 78 that pass through the corresponding apertures 80 in the base frame 36 and into the drilled and tapped bores 82 in the left rail legs 70, 72.

On the bicycle saddle 10, the left rail 42 is longer than the right rail 40, as the portion of the left rail 42 forward of the bend 76 moves to the right by an amount such that the upstanding front leg 72 of the left rail 42 is in front of the upstanding front leg 60 of the right rail 40 when they are fixed to the base frame 36 and both are along the longitudinal center line of the base frame 36. This arrangement allows the pommel portion 16 of both the base frame 36 and the seat bladder 12 to be narrower than if the rails 40 and 42 were uniformly parallel throughout their lengths and maintains the strength and rigidity of the base frame 36 better than having two spaced apertures through it in spaced apart locations off of the longitudinal center line. At the rear of the rails 40 and 42 the upstanding rear legs 58 and 70 are spaced apart by the desired separation of the rails in a wider, and therefore stronger, portion of the base frame 36. The rails 40 and 42 are parallel throughout the lengths of their central portions 62 and 74, along which they may be fastened to the seat post of a bicycle using a conventional clamping assembly.

A bottom fastening strap 84, which is complementary to the top fastening strap 34, is placed under, and in alignment with, the top fastening strap 34, that is, they are superposesd, with the bottom of the channel 30 between them. The bottom fastening strap 84 includes a front aperture 86 and a rear aperture 88, and there are aligned and corresponding apertures 89 and 91 in the top fastening strap 34 and in the seat bladder 12. A front spacer 90 is placed under the front aperture 86 and a rear spacer 92 is placed under the rear aperture 88. The front screw 38 and the rear screw 39 are passed though all of these elements, including the front aperture 89 in the top fastening strap 34 and the rear aperture 91 in the top fastening strap 34 and through the front aperture 94 and the rear aperture 96 in the base frame 36 and the front aperture 93 in the seat bladder 12 and the rear seat bladder aperture 142 (see FIG. 8), all secured with the self-locking nuts with nylon inserts 98, for example, or other desired fasteners.

The valve assembly 44 includes a valve stem 100, which passes downward through a receiving aperture 102 in a nose portion 104 of the base frame 36. The valve stem 100 has a retention body 107 fixed onto its top end. The retention body 107 has a sufficient diameter, thickness and strength to serve as a force spreading body and allows the retention body 107 to be firmly bonded into the corresponding receiving cylindrical fitting 106 in the nose pommel portion 18 of the seat bladder 12 (see FIGS. 5, 10, 10a). A jam nut 108 is tightened against the bottom surface of the base frame 36, securing the valve stem 100 and front end 20 of seat bladder 12 to the base frame 36. A valve core 146 (see FIG. 10) is threaded inside the valve stem 100 and is covered by a protective valve stem cap 110.

The seat bladder 12 is largely free to move about up and down away from the longitudinal center line without moving from side to side because it is fastened to the base frame 36 at three points, the receiving aperture 102 of the valve stem 100, the front aperture 94 in the base frame 36 and the rear aperture 96 in the base frame 36. The front and rear spacers 90, 92 elevate a bottom wall of the channel 30 above the plane of the base frame 36 to provide level support to the seat bladder 12 throughout its length as explained in greater detail below.

Figure 4:
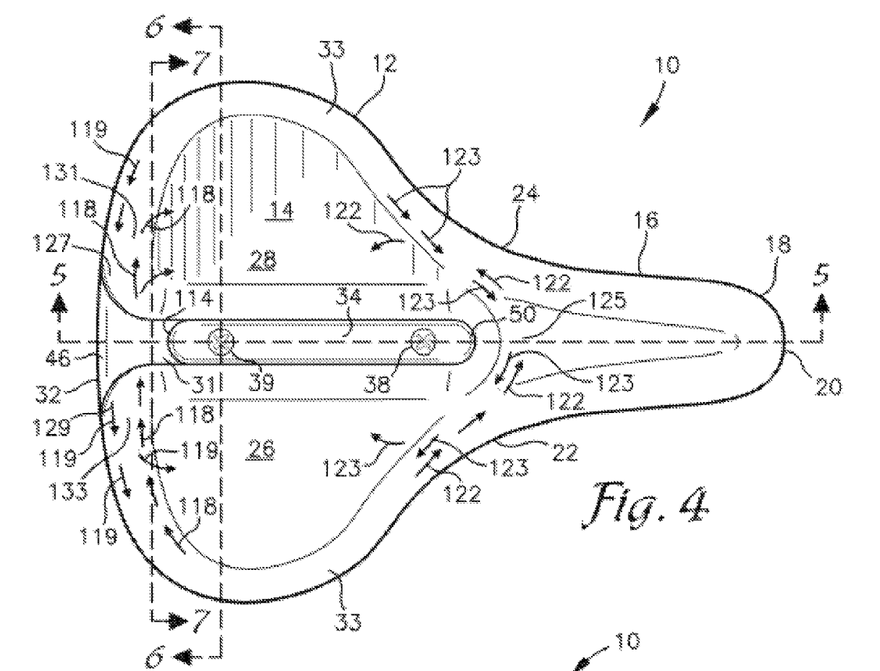
FIG. 4 is a top view of the bicycle saddle of FIG. 1.
Figure 5:
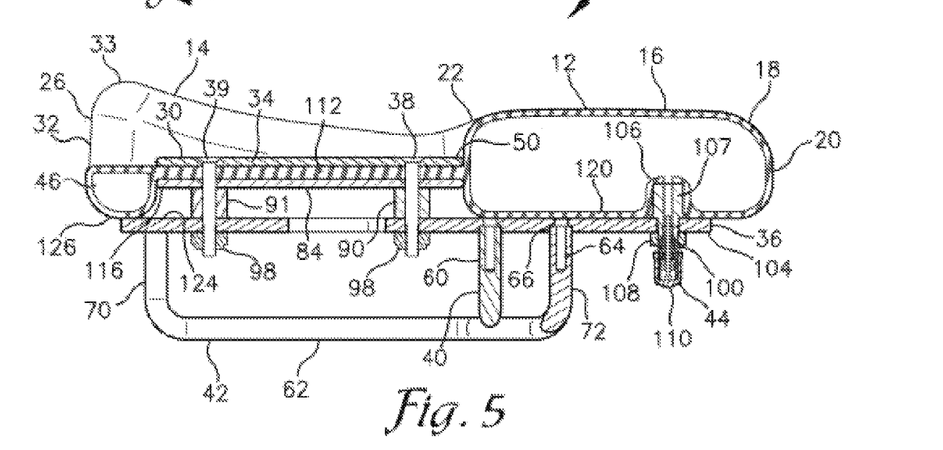
FIG. 5 is a cross section of the bicycle saddle of FIG. 1 taken along lines 5-5 of FIG. 4.

Referring to FIGS. 4 and 5, the rear fluid channel 46 lies along the rear perimeter of the seat bladder 12 and behind the rear edge 114 of the top fastening strap 34 and the rear edge 116 of the bottom fastening strap 84. The front fluid flows indicated by the directional arrows 122 and 123 take place throughout the pommel portion 16 and the cushion portions 26 and 28, which are all completely open to fluid flows with these portions of the bicycle saddle forming a front fluid flow zone 125 that permits the fluid flows 122 and 123. The rear fluid channel 46 and the front fluid flow zone 125 cooperate to balance the sitting force of a rider on the bicycle saddle 10.

When a person is sitting normally, as in a chair, the two sit bones, that is, the ischial tuberosity, equally support the person's sitting weight. In contrast, when a person or rider pedals a conventional bicycle in which the saddle is above the pedal crank, only one leg at a time rises into a sitting position, so only one sit bone at a time bears the majority of the person's sitting weight. This alternating distribution of the sitting force is balanced by the fluid flowing from one side to the other in the seat bladder 12. In operation, when the rider's right leg comes up, the extra force from the rider's right sit bone pushes fluid from the right side 26 of the bicycle saddle 10 to the left side 28 of the bicycle saddle 10. When the rider's left leg comes up, the opposite happens. And no matter what the pedal position is, dynamically flowing fluid keeps the force on the right sit bone and the left sit bone balanced, just as sitting naturally on a chair does.

Corresponding fluid flows are shown by the directional arrows 118 and 119 through the rear fluid channel 46 and by the directional arrows 122 and 123 through the front fluid zone 125 in the pommel portion 16. These fluid flows remain the same regardless of the type of fluid used to fill the interior of the seat bladder 12, as long as the seat bladder 12 is not filled under such pressure that the fluid inside is constrained from moving. After the fluid flows through the rear fluid channel 46 and through the pommel portion 16 from one side to the other, it defuses throughout the relevant right side or left side cushion 26 or 28, respectively.

The rear fluid channel 46 is a closed tube-like structure open at each end and having a left end 127 and a right end 129. Once the fluid is pushed through the rear fluid channel 46 and exits through the left end 127, the fluid flows into the left rear fluid flow zone 131, where it diffuses throughout the left side cushion 28. In the other half of the cycle, when fluid is pushed through the rear fluid channel 46 and exits through the right end 129, the fluid diffuses into the right rear fluid flow zone 133 and then throughout the right side cushion 26. Thus the rear fluid channel 46 connects the right side cushion 26 and the left side cushion 28 at the rear of the bicycle saddle 10 and allows fluid communication between them in either direction. Simultaneously, the front fluid zone 125, which also connects the right side cushion and the left side cushion 28, allows fluid communication between the right side cushion 26 and the left side cushion 28 at the front end 20 of the bicycle saddle 10 and throughout the pommel portion 16 in either direction. The general direction of fluid flows through the rear fluid channel 46 and through the fluid flow zone 125 is the same in both channels during any portion of the rider's cycling stroke.

The rear fluid channel 46 generally lies below and is separate from any part of the seating surface 14 or the bottom wall 112 of the seat bladder 12 in the portion of the seat bladder 12 beneath the seating surface 14. Fluid is free to flow from the right side cushion 26 to the left side cushion 28 and vise versa as weight is shifted from one side to the other and back, as is natural in a pedaling cycle of one rotation of the bicycle crankshaft, through the channel 46 and through the open fluid communication passages created by the open cavity of the pommel portion 16 into the right side cushion 26 and into the left side cushion 28. The pommel portion 16 bottom wall 120 and the channel bottom wall 126 of the rear fluid channel 46 are level with the upper surface 124 of the base frame 36.

Only about one-half of the width of the channel bottom wall 126 is supported by the base frame 36, also increasing the cushioning effect of the bicycle saddle 10. The bottom wall 112 of the longitudinal channel 30 portion of the seat bladder 12 is higher than the bottom wall 120 of the pommel portion 16 and of the bottom wall 126 of the rear fluid channel 46 by an amount that is the height of the spacers 90, 91, especially in relation to FIG. 5, in which it is clear that the bottom wall, or internal wall, 112 of the channel 30 is a solid internal wall 112 formed as a single member and is not merely two layers of material squeezed together, as if, for example, two sides of an inner tube were squeezed together.

Figure 6:
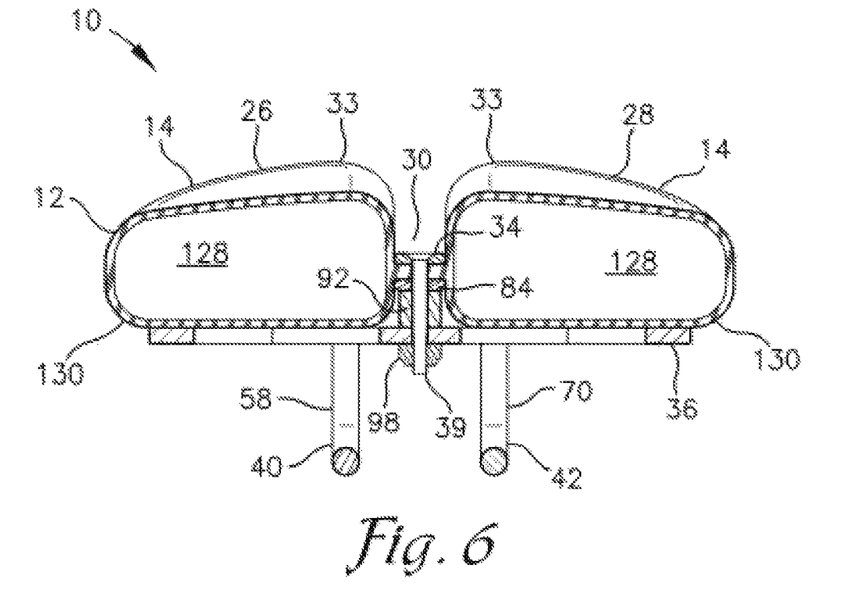
FIG. 6 is a cross section of the bicycle saddle of FIG. 1 taken along lines 6-6 of FIG. 4.

Referring to FIG. 6, the seat bladder 12 may be filled with air or other gas as indicated by the void, cavity, or chamber 128 under the seating surface 14 in the hollow seat bladder 12. The user may inflate the seat bladder 12 to any desired pressure, although most riders will find an air pressure in the seat bladder 12 of between about 20-40 kPa (3-6 psi) to be comfortable. The overhang 130 of the seat bladder 12 over the base frame 36 is variable throughout the perimeter of the base frame 36, at described in greater detail below.

Figure 7:
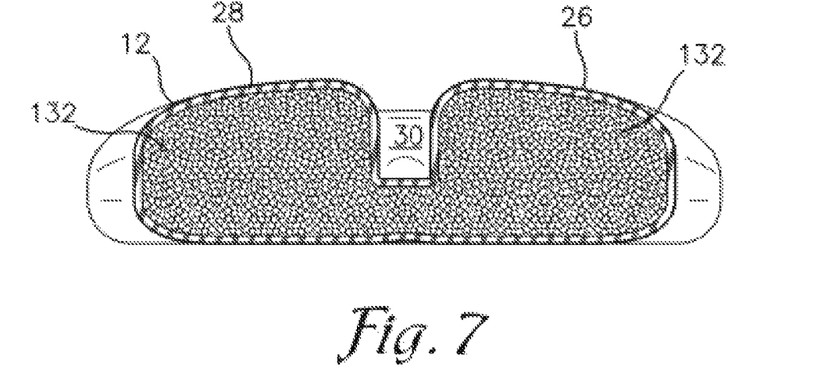
FIG. 7 is a cross section of the bicycle saddle of FIG. 1 taken along lines 7-7 of FIG. 4.

Referring to FIG. 7, some riders may prefer to fill the sent bladder 12 with a fluid denser than air or other gas. Water is a good choice for that fluid for many riders, but some riders may find that the added weight, typically about 0.5 kg (1 pound), adds more weight than desired to the total weight of the bicycle (not shown). Water entrained with small plastic granules or balls, preferably micro-spheres made of expanded polystyrene beads, or the like, may be used to reduce weight. Adding these beads, which have a very low density, in high proportion to water dramatically reduces the density of the mixture and therefore the weight of water in the seat bladder 12, while retaining the flow characteristics of water alone.

Figure 8:
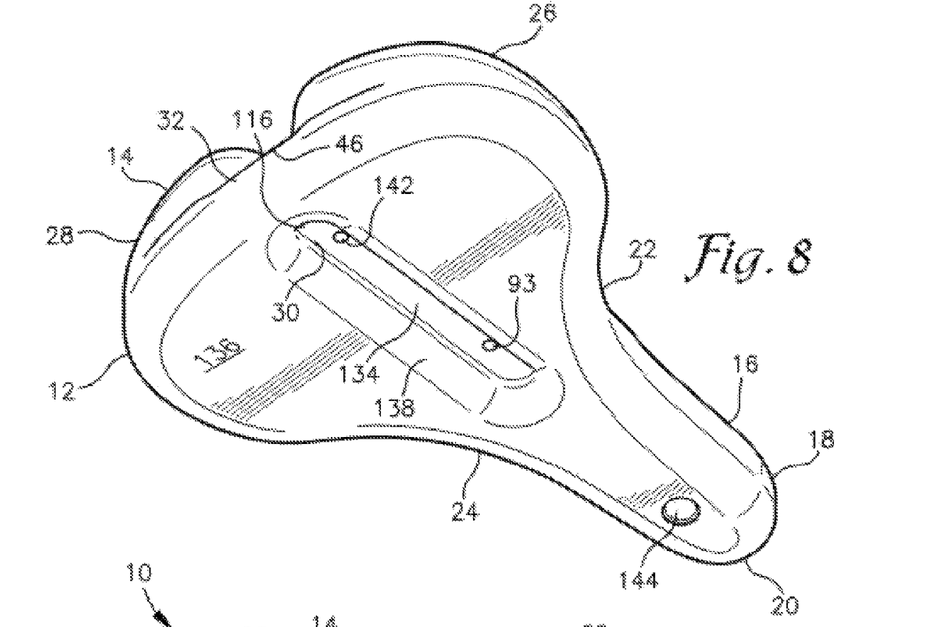
FIG. 8 is an upward looking perspective view of the seat bladder of the bicycle saddle of FIG. 1.

Referring to FIG. 8, the longitudinal channel 30 is formed into the seat bladder 12 during molding and that the bottom surface 134 of the longitudinal channel 30 is recessed from the bottom surface 136 of the uninflated seat bladder 12, which is generally flat except for the vortex-like downward sweep to form a deep lower recess 138 leading to the longitudinal channel 30. A front aperture 93 and a rear aperture 142 is molded into the longitudinal channel 30 of the seat bladder 12 to accommodate the front and rear screws 38 and 39, respectively. The valve stem opening 144 is shown as an open hole in the pommel nose 18, on the bottom surface 136 of the seat bladder 12.

Figure 9:
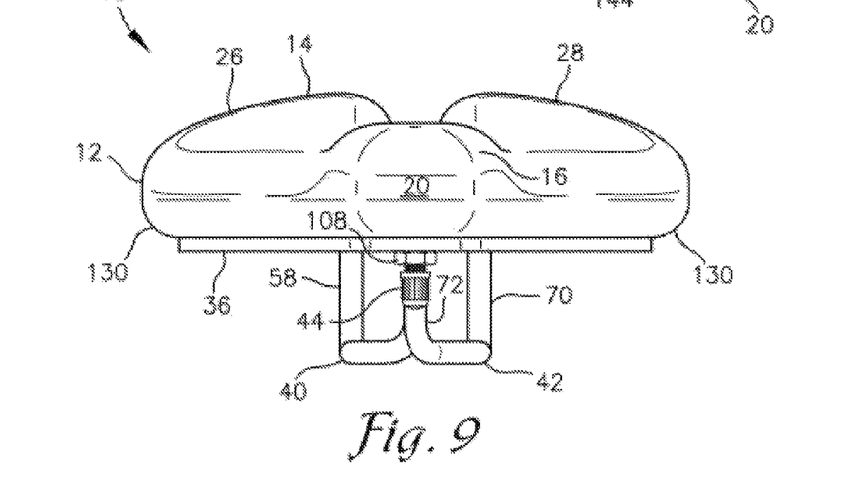
FIG. 9 is a front view of the bicycle saddle of FIG. 1.

Referring to FIG. 9, shows the overhang 130 in a front view of the bicycle saddle 10 and the left rail 42 crossing in front of the right rail 40 toward the front of the bicycle saddle 10, so that the front leg 60 (see FIG. 2) of the right rail 40 and the front leg 72 of the left rail 42 both lie along the longitudinal centerline of the base frame 36. The front leg 72 of the left rail 42 is in front of the front leg 60 of the right rail 40, allowing a narrower pommel portion 16 in the seat bladder 12 and the base frame 36. The width of the overhang 130 may vary throughout the perimeter of the seat bladder 12, generally being wider along the perimeter of the right and left cushion portions 26 and 28 respectively and generally narrower throughout the pommel portion 16, generally ranging from about 0.95-1.9 cm (0.375-0.75 inches) (see also FIGS. 2, 6, 9). When a rider sits on the bicycle saddle 10, the overhang 130 tends to increase as the seat bladder 12 becomes effectively thinner and its perimeter increases as the seat bladder 12 spreads outwardly.

Figure 10:
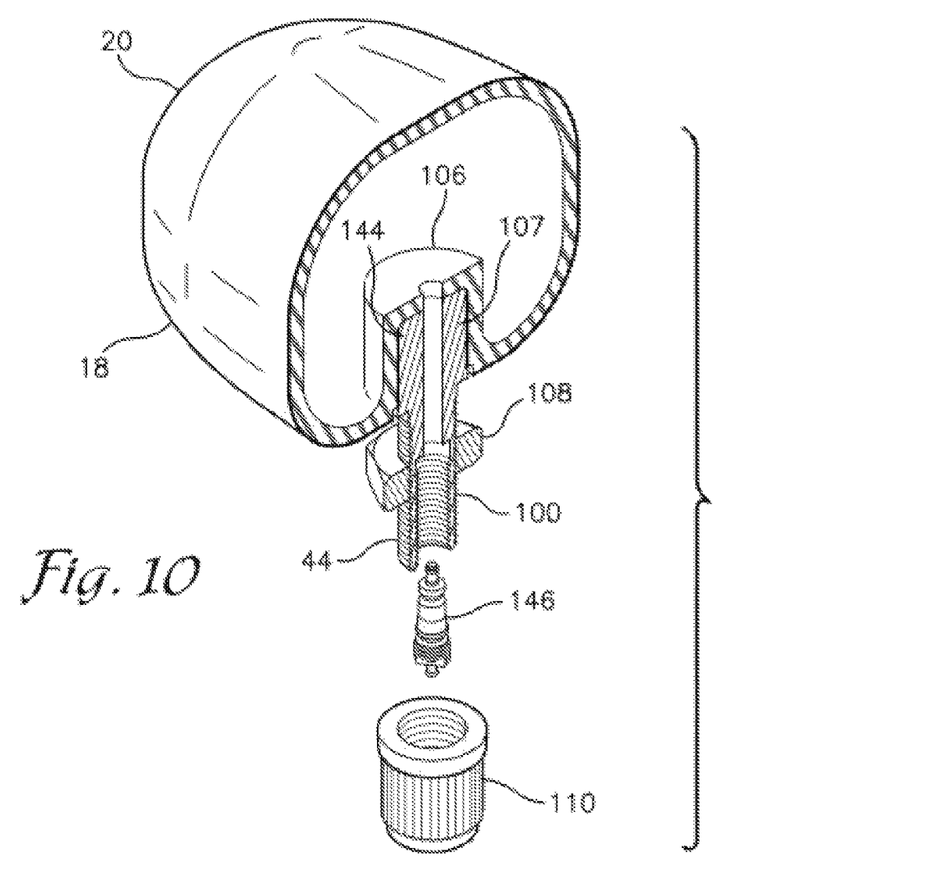
FIG. 10 is a fragmentary exploded perspective view of a valve assembly integral to the bicycle saddle of FIG. 1 for filling the bicycle saddle of FIG. 1 with a fluid.

Referring to FIG. 10, the seat bladder 12 is adapted to be filled with air, as the valve assembly 44 includes a conventional valve core 146 of the type generally found in virtually all automobile tires and many bicycle tires, such as a Schrader valve, Presta valve, or Dunlop valve, for example. Any conventional type of fitting between an air pump or compressor (not shown) can be attached to the end of the valve stem 100 and used to inflate the seat bladder 12 to the desired pressure.

Figure 10A:
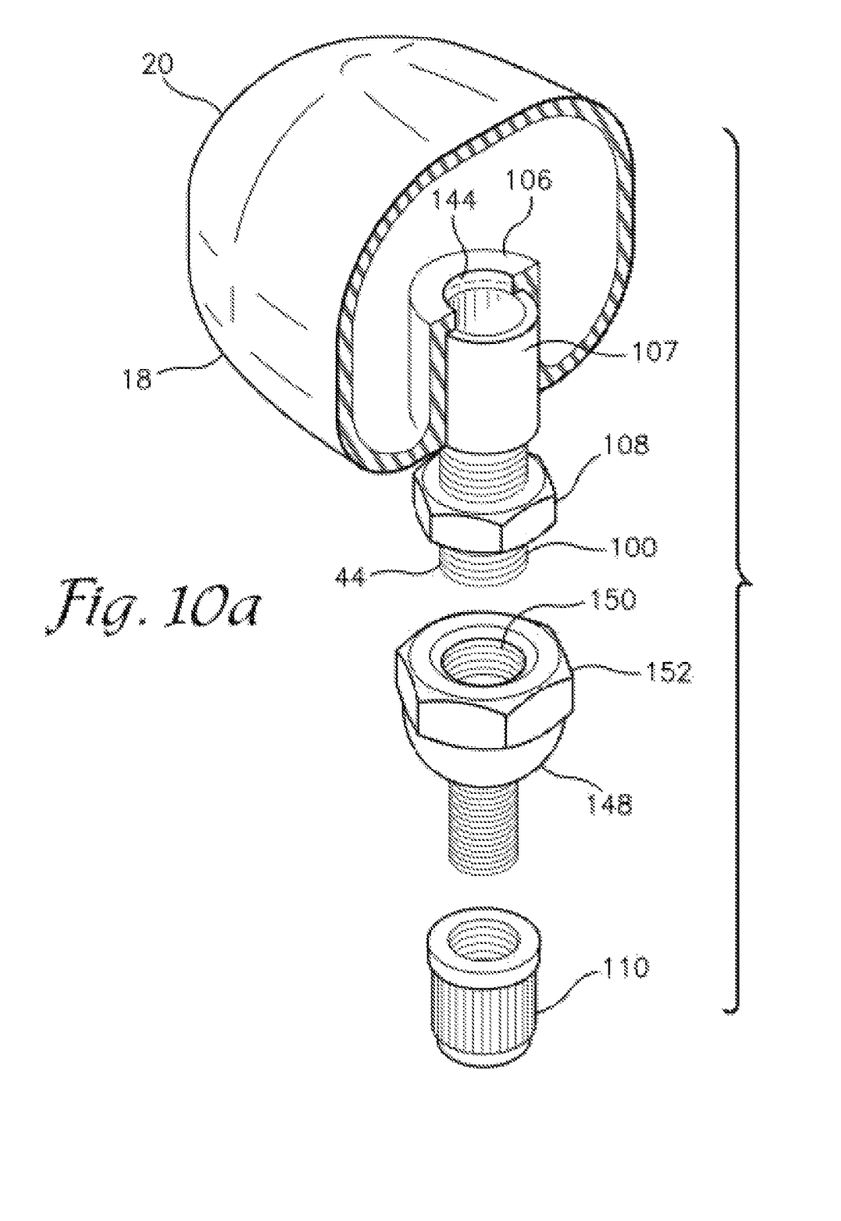
FIG. 10a is a fragmentary exploded perspective view of an alternative valve assembly integral to the bicycle saddle of FIG. 1 for filling the bicycle saddle of FIG. 1 with a fluid.

Referring to FIG. 10a, the seat bladder 12 is adapted to be filled with a mixture of water and expanded polystyrene beads 132 (see FIG. 7) by removing the valve core 146 of FIG. 10 and replacing it with the hollow stem extension 148. In this embodiment, the valve stem 100 may have a larger inside diameter than that of FIG. 10, but need not. The open channel 150 of the hollow stem extension 148 allows water or other liquids to flow easily into the cavity or void 128 (see FIG. 6) of the seat bladder 12. The top end of the hollow stem extension member 148 includes a nut portion 152 having internal threads that fit onto the external threads of the valve stem 100.

Figure 11:
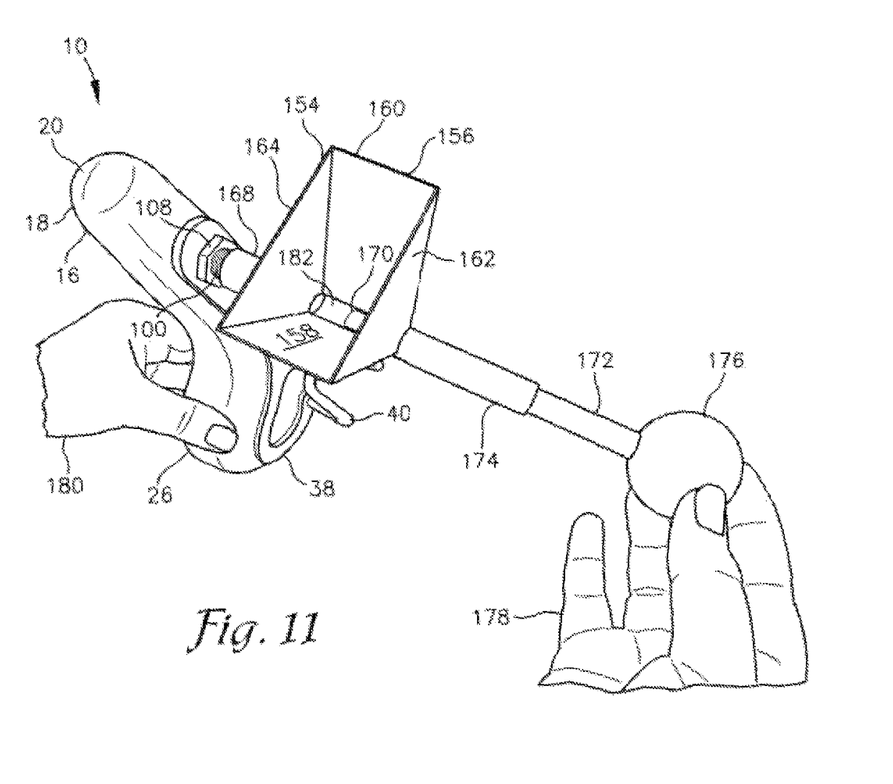
FIG. 11 is an isometric view of a funnel assembly for use in filling the bicycle saddle of FIG. 1 with solid particles that will become entrained in a liquid, shown in use in with the bicycle saddle of FIG. 1.

Referring to FIG. 11, a loading device 154 has been developed for filling the seat bladder 12 with the small plastic beads of expanded polystyrene. It has been found that if the expanded polystyrene beads are mixed with water into a slurry, the beads tend to float along the water or other liquid and to flow backward out of the valve assembly 44, which prevents introducing a satisfactory volume of beads into the seat bladder 12. The loading device, along with other measures shown in FIGS. 1-14 and discussed below, overcomes this problem. The loading device 154 includes a loading bin 156 with a uniform V-shaped cross section along its length, having a front wall 158 and a rear wall 160 which is closed by a connected front end wall 162 and a connected rear end wall 164, creating a closed, but open-topped loading bin 156, into which dry beads are introduced.

The loading device includes a distal end threaded fitting 166 that screws onto the valve stem 100 of FIG. 10a. A piston 170 connected to a piston rod 172 is adapted for reciprocal movement in through a piston sleeve 174 and has a proximal end knob 176 that is grasped by a user's right hand 178, while his left hand 180 holds the bicycle saddle 10. The piston sleeve 174 is a tube of uniform circular cross section that is fastened to the bottom of the loading bin 156, whose bottom edge is rounded to the radius of the piston sleeve 174. An opening 182 is formed in an upper portion of the piston sleeve 174 where the piston sleeve 174 passes through the loading bin 156, into which the plastic beads in the loading bin 156 fall. Naturally, a fixture to hold the bicycle saddle 10 during this operation may be devised.

Figure 12:
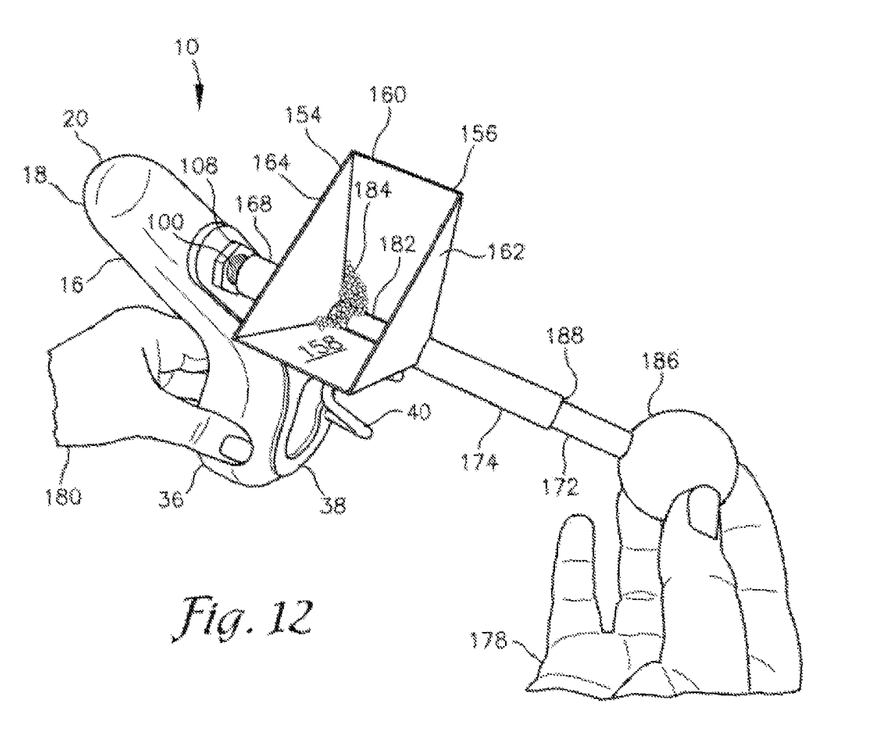
FIG. 12 is a perspective view of the assembly of FIG. 11 showing the process of loading solid particles into the bicycle saddle of FIG. 1.

Referring to FIG. 12, a quantity of expanded polystyrene beads 184 are introduced into the loading bin 156 and the piston 170 is repeatedly moved back-and-forth along the piston sleeve 174, with each push of the piston 170 toward the bicycle saddle 10 pushing the expanded polystyrene beads, or bead, 184 that fall into the opening 182 into the void or cavity 128 of the seat bladder 12. This process is repeated until the seat bladder 12 cannot accept any more expanded polystyrene beads 184. This number may be maximized by holding the bicycle saddle 10 upside down during filling. Now the bicycle saddle 10 is ready for use, save for filling with water or other liquid.

The piston 170 has been pushed toward the bicycle saddle 10, thereby loading the expanded polystyrene beads 184 into the seat bladder 12. The length of the piston rod 172 allows the distal end surface of the knob 176 to serve as a stop by limiting the travel of the piston rod 172 and piston 170 when the knob 176 contacts the proximal end 188, preventing the piston 170 from traveling too far into the seat bladder 12. The piston 170 may be merely the end of the piston rod 172, but it acts as a piston because it moves matter through a chamber.

Figure 13:
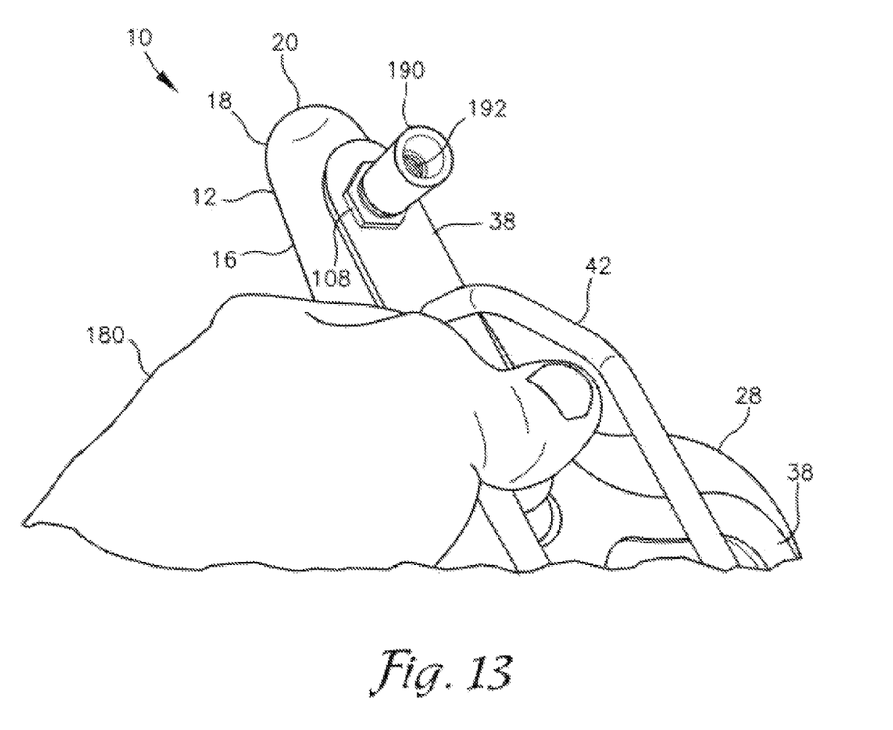
FIG. 13 is a perspective view of the bicycle saddle of FIG. 1 showing a screen covering a filing valve.

Referring to FIG. 13, it has been found that if water or other liquid is introduced directly into the valve stem 100, the beads 184 will flow back out of the valve stem 100. To prevent this, a tubular fitting 190 having a screen 192 in its throat is screwed on the valve stem 100.

Figure 14:
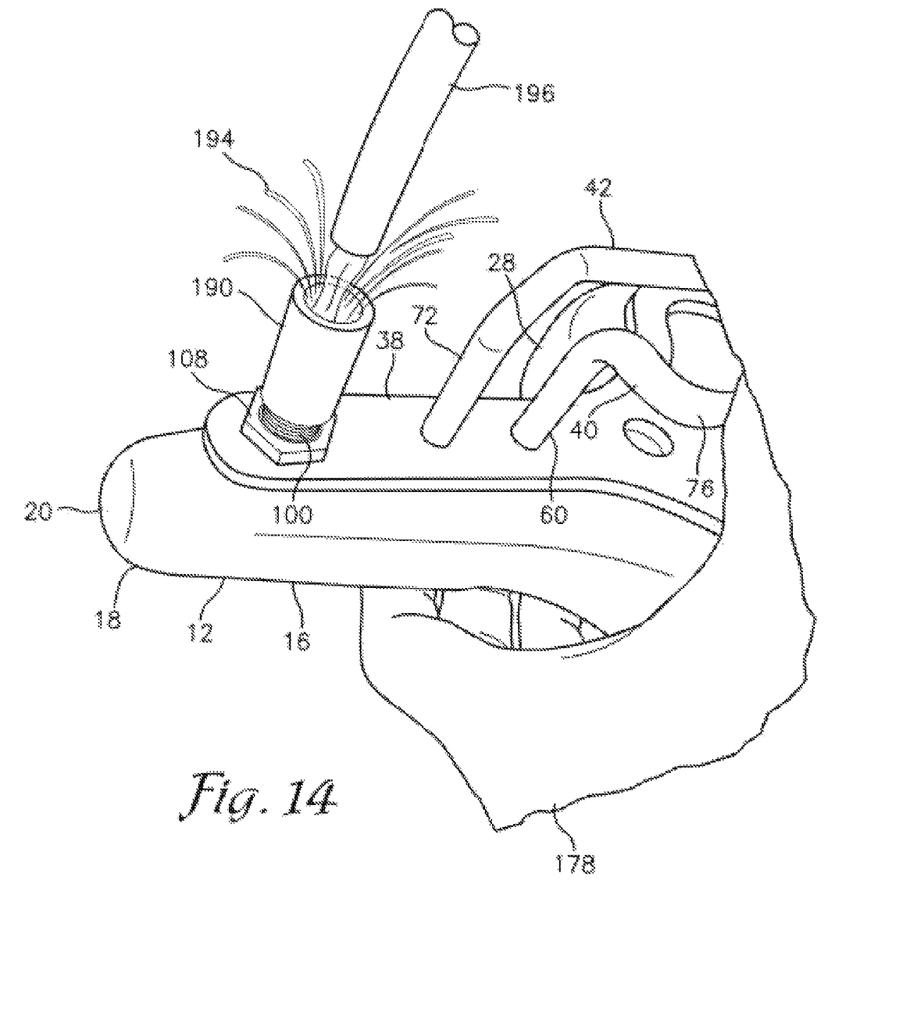
FIG. 14 is a perspective view of the bottom front portion of the bicycle saddle of FIG. 1 showing the seat bladder being filled with a fluid.

Referring to FIG. 14, water or other liquid 194 flowing through a hose 196 is introduced into the seat bladder 12 until it is almost full. Then the tubular fitting 190 is removed and is replaced by the hollow stem extension member 148, which is then sealed with the valve cap 110. The bicycle saddle 10 is now ready for use and can be installed on a bicycle.

Figure 15:
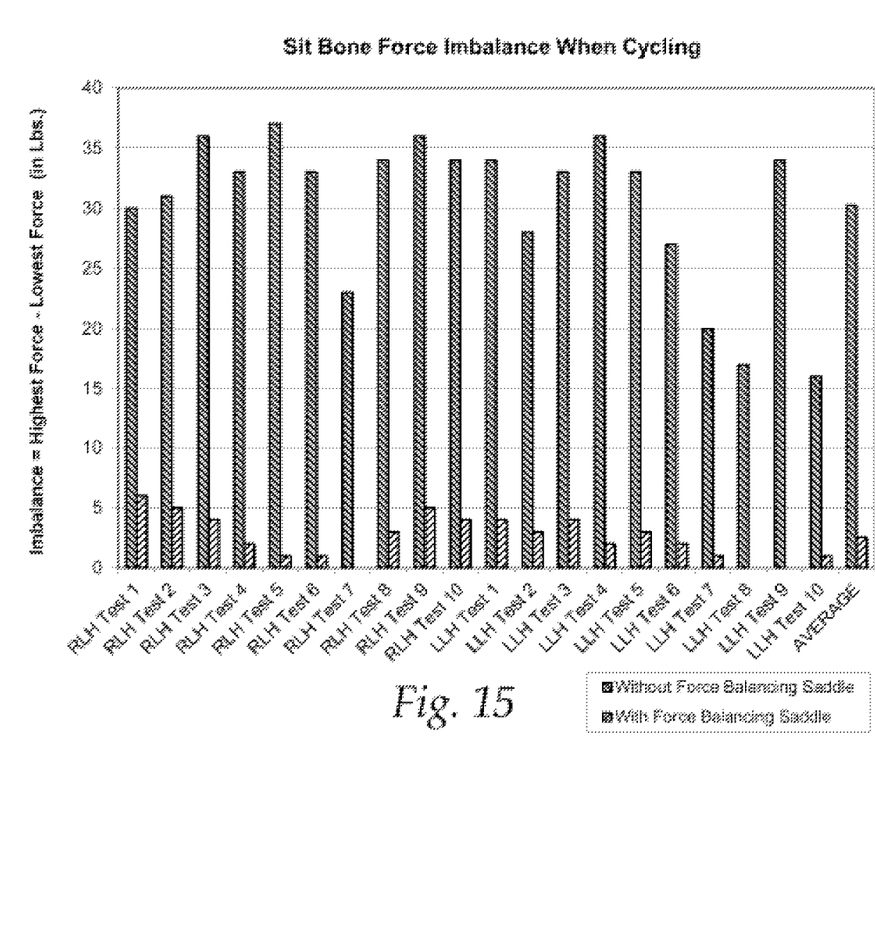
FIG. 15 is a bar graph showing right and left sit bone force imbalance in pounds when cycling.
Figure 16:
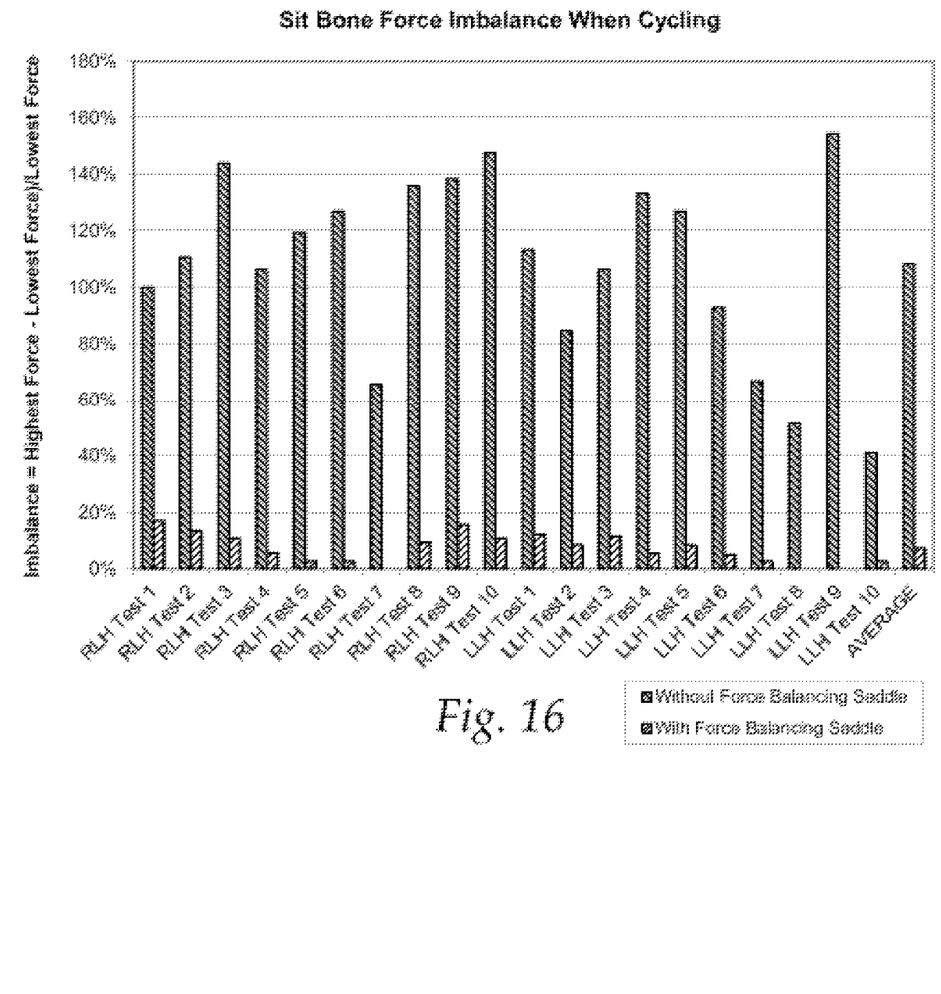
FIG. 16 is a bar graph showing right and left sit bone force imbalance as a percentage when cycling.

Referring to FIGS. 15 and 16, graphs depicting the sit bone force imbalance when cycling is illustrated as a difference in pounds of force (FIG. 15) and a percentage (FIG. 16). For example, when peddling a bicycle, only one sit bone at a time bears the majority of sitting force because only one leg at a time raises into a sitting position with the thigh generally parallel to the ground. In the sitting position, the difference between the force on the right sitting bone and the left sitting bone is greatest. For example, for the right leg high test 1 (RLH Test 1), the difference in pounds measured between the left sit bone and the right sit bone when the right leg is high is 30 pounds for a conventional bike saddle, or 100% (FIG. 16). For the bike saddle 10 of the present invention, the difference in pounds measured between the left sit bone and the right sit bone when the right leg is high is 6 pounds, or 17% (FIG. 16).

For the right leg high test 2 (RLH Test 2), the difference in pounds measured between the left sit bone and the right sit bone when the right leg is high is 31 pounds for a conventional bike saddle, or 111% (FIG. 16). For the bike saddle 10 of the present invention, the difference in pounds measured between the left sit bone and the right sit bone when the right leg is high is 5 pounds, or 14% (FIG. 16).

For the right leg high test 3 (RLH Test 3), the difference in pounds measured between the left sit bone and the right sit bone when the right leg is high is 36 pounds for a conventional bike saddle, or 144% (FIG. 16). For the bike saddle 10 of the present invention, the difference in pounds measured between the left sit bone and the right sit bone when the right leg is high is 4 pounds, or 11% (FIG. 16).

For the right leg high test 4 (RLH Test 4), the difference in pounds measured between the left sit bone and the right sit bone when the right leg is high is 33 pounds for a conventional bike saddle, or 106% (FIG. 16). For the bike saddle 10 of the present invention, the difference in pounds measured between the left sit bone and the right sit bone when the right leg is high is 2 pounds, or 6% (FIG. 16).

For the right leg high test 5 (RLH Test 5), the difference in pounds measured between the left sit bone and the right sit bone when the right leg is high is 37 pounds for a conventional bike saddle, or 119% (FIG. 16). For the bike saddle 10 of the present invention, the difference in pounds measured between the left sit bone and the right sit bone when the right leg is high is 1 pound, or 3% (FIG. 16).

For the right leg high test 6 (RLH Test 6), the difference in pounds measured between the left sit bone and the right sit bone when the right leg is high is 33 pounds for a conventional bike saddle, or 127% (FIG. 16). For the bike saddle 10 of the present invention, the difference in pounds measured between the left sit bone and the right sit bone when the right leg is high is 1 pound, or 3% (FIG. 16).

For the right leg high test 7 (RLH Test 7), the difference in pounds measured between the left sit bone and the right sit bone when the right leg is high is 23 pounds for a conventional bike saddle, or 66% (FIG. 16). For the bike saddle 10 of the present invention, the difference in pounds measured between the left sit bone and the right sit bone when the right leg is high is 0 pounds, or 0% (FIG. 16).

For the right leg high test 8 (RLH Test 8), the difference in pounds measured between the left sit bone and the right sit bone when the right leg is high is 34 pounds for a conventional bike saddle, or 136% (FIG. 16). For the bike saddle 10 of the present invention, the difference in pounds measured between the left sit bone and the right sit bone when the right leg is high is 3 pounds, or 9% (FIG. 16).

For the right leg high test 9 (RLH Test 9), the difference in pounds measured between the left sit bone and the right sit bone when the right leg is high is 36 pounds for a conventional bike saddle, or 138% (FIG. 16). For the bike saddle 10 of the present invention, the difference in pounds measured between the left sit bone and the right sit bone when the right leg is high is 5 pounds, or 16% (FIG. 16).

For the right leg high test 10 (RLH Test 10), the difference in pounds measured between the left sit bone and the right sit bone when the right leg is high is 34 pounds for a conventional bike saddle, or 148% (FIG. 16). For the bike saddle 10 of the present invention, the difference in pounds measured between the left sit bone and the right sit bone when the right leg is high is 4 pounds, or 11% (FIG. 16).

For the left leg high test 1 (LLH Test 1), the difference in pounds measured between the left sit bone and the right sit bone when the left leg is high is 34 pounds for a conventional bike saddle, or 13% (FIG. 16). For the bike saddle 10 of the present invention, the difference in pounds measured between the left sit bone and the right sit bone when the left leg is high is 4 pounds, or 12% (FIG. 16).

For the left leg high test 2 (LLH Test 2), the difference in pounds measured between the left sit bone and the right sit bone when the left leg is high is 28 pounds for a conventional bike saddle, or 85% (FIG. 16). For the bike saddle 10 of the present invention, the difference in pounds measured between the left sit bone and the right sit bone when the left leg is high is 3 pounds, or 9% (FIG. 16).

For the left leg high test 3 (LLH Test 3), the difference in pounds measured between the left sit bone and the right sit bone when the left leg is high is 33 pounds for a conventional bike saddle, or 106% (FIG 16). For the bike saddle 10 of the present invention, the difference in pounds measured between the left sit bone and the right sit bone when the left leg is high is 4 pounds, or 11% (FIG. 16).

For the left leg high test 4 (LLH Test 4), the difference in pounds measured between the left sit bone and the right sit bone when the left leg is high is 36 pounds for a conventional bike saddle, or 133% (FIG. 16). For the bike saddle 10 of the present invention, the difference in pounds measured between the left sit bone and the right sit bone when the left leg is high is 2 pounds, or 5% (FIG. 16).

For the left leg high test 5 (LLH Test 5), the difference in pounds measured between the left sit bone and the right sit bone when the left leg is high is 33 pounds for a conventional bike saddle, or 127% (FIG. 16). For the bike saddle 10 of the present invention, the difference in pounds measured between the left sit bone and the right sit bone when the left leg is high is 3 pounds, or 8% (FIG. 16).

For the left leg high test 6 (LLH Test 6), the difference in pounds measured between the left sit bone and the right sit bone when the left leg is high is 27 pounds for a conventional bike saddle, or 93% (FIG. 16). For the bike saddle 10 of the present invention, the difference in pounds measured between the left sit bone and the right sit bone when the left leg is high is 2 pounds, or 5% (FIG. 16).

For the left leg high test 7 (LLH Test 7), the difference in pounds measured between the left sit bone and the right sit bone when the left leg is high is 20 pounds for a conventional bike saddle, or 67% (FIG. 16). For the bike saddle 10 of the present invention, the difference in pounds measured between the left sit bone and the right sit bone when the left leg is high is 1 pound, or 3% (FIG. 16).

For the left leg high test 8 (LLH Test 8), the difference in pounds measured between the left sit bone and the right sit bone when the left leg is high is 17 pounds for a conventional bike saddle, or 52% (FIG. 16). For the bike saddle 10 of the present invention, the difference in pounds measured between the left sit bone and the right sit bone when the left leg is high is 0 pounds, or 0% (FIG. 16).

For the left leg high test 9 (LLH Test 9), the difference in pounds measured between the left sit bone and the right sit bone when the left leg is high is 34 pounds for a conventional bike saddle, or 155% (FIG. 16). For the bike saddle 10 of the present invention, the difference in pounds measured between the left sit bone and the right sit bone when the left leg is high is 0 pounds, or 0% (FIG. 16).

For the left leg high test 10 (LLH Test 10), the difference in pounds measured between the left sit bone and the right sit bone when the left leg is high is 16 pounds for a conventional bike saddle, or 41% (FIG. 16). For the bike saddle 10 of the present invention, the difference in pounds measured between the left sit bone and the right sit bone when the left leg is high is 1 pound, or 3% (FIG. 16).

The average for the conventional bike saddle is 30 pounds or 108%. The average for the bike saddle 10 of the present invention is 3 pounds or 7%.

While the present invention has been described in accordance with the preferred embodiments thereof, the description is for illustration only and should not be construed as limiting she scope of the invention. Various changes and modifications may be made by those skilled in the art without departing from the spirit and scope of the invention as defined by the following claims.

Having thus described the invention, what is claimed as new and desired to be secured by Letters Patent is as follows:

1. A bicycle saddle comprising:
   a seat bladder fastened to an underlying base frame along a longitudinal centerline of said seat bladder and a superposed longitudinal centerline of said base frame;
   said seat bladder further comprising a pommel portion and a seating surface portion behind said pommel portion and a recessed longitudinal channel running from a point adjacent to a rear edge of said seat bladder to a point adjacent to said pommel portion of said seat bladder, wherein said longitudinal channel divides said seat bladder into a right side cushion and a left side cushion and at least two fasteners through said longitudinal channel fastening said seat bladder to said base frame;
   a valve assembly fixed into the bottom surface of said seat bladder adjacent to said pommel nose of said seat bladder with said valve assembly further comprising a valve stem and said valve stem projects downwardly from said seat bladder and through said base frame and is fastened thereto;
   a rear fluid channel connecting said right side cushion and said left side cushion; and
   a front fluid flow zone connecting said right side cushion and said left side cushion adjacent to said pommel, and
   superposed top and bottom fastening straps disposed above and below said longitudinal channel and a pair of spacers between a lower surface of said longitudinal channel and one or more fasteners for fastening said longitudinal channel, said top and bottom fastening straps and said base frame together,
   whereby said rear fluid channel and said front fluid flow zone cooperate to balance the sitting force of a rider on the bicycle saddle.

2. A bicycle saddle of claim 1 further comprising a pair of rails depending from said base frame fastened to said base frame and aligned along a longitudinal axis of said bicycle saddle and parallel to one another for a portion of their lengths and lying equidistant from said base frame for said parallel portion of their lengths.

* * * * *